(12) United States Patent
Goshen et al.

(10) Patent No.: US 11,451,689 B2
(45) Date of Patent: Sep. 20, 2022

(54) SYSTEM AND METHOD FOR MATCHING AUDIO CONTENT TO VIRTUAL REALITY VISUAL CONTENT

(71) Applicant: InSoundz Ltd., Tel Aviv OT (IL)

(72) Inventors: Tomer Goshen, Tel Aviv (IL); Emil Winebrand, Petach Tikva (IL)

(73) Assignee: Insoundz Ltd., Tel Aviv (IL)

( * ) Notice: Subject to any disclaimer, the term of this patent is extended or adjusted under 35 U.S.C. 154(b) by 407 days.

(21) Appl. No.: 15/948,417

(22) Filed: Apr. 9, 2018

(65) Prior Publication Data
US 2018/0295259 A1 Oct. 11, 2018

Related U.S. Application Data

(60) Provisional application No. 62/483,391, filed on Apr. 9, 2017.

(51) Int. Cl.
| | | |
|---|---|---|
| H04N 5/06 | (2006.01) |
| G06T 19/00 | (2011.01) |
| G06F 3/01 | (2006.01) |
| H04N 21/8547 | (2011.01) |
| H04N 21/81 | (2011.01) |
| H04R 27/00 | (2006.01) |
| H04N 21/2368 | (2011.01) |
| H04N 21/80 | (2011.01) |
| H04N 21/84 | (2011.01) |
| H04N 21/6587 | (2011.01) |
| H04N 21/234 | (2011.01) |
| H04N 21/218 | (2011.01) |

(52) U.S. Cl.
CPC .............. *H04N 5/06* (2013.01); *G06F 3/011* (2013.01); *G06F 3/013* (2013.01); *G06T 19/006* (2013.01); *H04N 21/21805* (2013.01); *H04N 21/2368* (2013.01); *H04N 21/23418* (2013.01); *H04N 21/6587* (2013.01); *H04N 21/80* (2013.01); *H04N 21/816* (2013.01); *H04N 21/8106* (2013.01); *H04N 21/8126* (2013.01); *H04N 21/8146* (2013.01); *H04N 21/84* (2013.01); *H04N 21/8547* (2013.01); *H04R 27/00* (2013.01); *H04S 2400/11* (2013.01)

(58) Field of Classification Search
None
See application file for complete search history.

(56) References Cited

U.S. PATENT DOCUMENTS

| | | |
|---|---|---|
| 6,041,127 A | 3/2000 | Elko |
| 6,409,599 B1 | 6/2002 | Sprout et al. |
| 8,012,023 B2 | 9/2011 | Gates et al. |
| 8,243,970 B2 | 8/2012 | Dent |
| 9,143,729 B2 | 9/2015 | Anand et al. |
| 9,380,177 B1 | 6/2016 | Rao et al. |
| 9,560,467 B2 | 1/2017 | Gorzel et al. |

(Continued)

*Primary Examiner* — Hilina K Demeter
(74) *Attorney, Agent, or Firm* — M&B IP Analysts, LLC

(57) ABSTRACT

A system and method for matching audio content to virtual reality visual content. The method includes analyzing received visual content and received metadata to determine an optimal audio source associated with the received visual content; configuring the optimal audio source to capture audio content; synthesizing the captured audio content with the received visual content; and providing the synthesized captured audio content and received visual content to a virtual reality (VR) device.

15 Claims, 4 Drawing Sheets

(56) References Cited

U.S. PATENT DOCUMENTS

| | | | |
|---|---|---|---|
| 2014/0376728 A1* | 12/2014 | Ramo | H04S 7/40 |
| | | | 381/56 |
| 2015/0058102 A1* | 2/2015 | Christensen | H04N 5/23238 |
| | | | 705/14.6 |
| 2015/0254871 A1* | 9/2015 | MacMillan | H04N 21/233 |
| | | | 382/180 |
| 2015/0279079 A1 | 10/2015 | Wieczorek | |
| 2015/0302651 A1 | 10/2015 | Shpigelman | |
| 2016/0085305 A1 | 3/2016 | Spio | |
| 2016/0150340 A1* | 5/2016 | Seligmann | H04R 27/00 |
| | | | 381/1 |
| 2016/0189334 A1* | 6/2016 | Mason | G06F 16/444 |
| | | | 345/419 |
| 2016/0269712 A1 | 9/2016 | Ostrover et al. | |
| 2016/0284059 A1 | 9/2016 | Solis | |
| 2016/0295038 A1 | 10/2016 | Rao et al. | |
| 2016/0330563 A1 | 11/2016 | Chen et al. | |
| 2016/0350609 A1* | 12/2016 | Mason | G06T 15/20 |
| 2017/0039766 A1 | 2/2017 | Passmore et al. | |
| 2017/0040028 A1* | 2/2017 | Seligmann | G10L 21/10 |
| 2017/0064154 A1* | 3/2017 | Tseng | H04N 21/43072 |
| 2017/0109131 A1* | 4/2017 | Boesen | G06F 3/012 |
| 2017/0206708 A1* | 7/2017 | Gentilin | G06T 19/006 |
| 2017/0371518 A1* | 12/2017 | Leppänen | G06F 3/165 |
| 2018/0040162 A1* | 2/2018 | Donnelly | G02B 27/0179 |
| 2018/0040163 A1* | 2/2018 | Donnelly | G01C 21/3647 |

* cited by examiner

SYSTEM AND METHOD FOR MATCHING AUDIO CONTENT TO VIRTUAL REALITY VISUAL CONTENT

CROSS-REFERENCE TO RELATED APPLICATIONS

This application claims the benefit of U.S. Provisional Application No. 62/483,391 filed on Apr. 9, 2017, the contents of which are hereby incorporated by reference.

TECHNICAL FIELD

The present disclosure relates generally to audio systems, and more particularly to audio systems matching audio content to virtual reality (VR) visual content.

BACKGROUND

Providing audio for use in broadcasting, and, in particular, for use in the broadcasting of sporting events, is a complex art and science. Microphones used to capture sound within a sports arena or stadium must accurately capture and reproduce the sounds of a complex and often irregular space. Such equipment requires demanding physical resilience to be robust enough to withstand wind and weather, and maintain reliability under rough, everyday conditions while being able to be dismantled and packed away easily. The placement of sound equipment within a sports arena or stadium is additionally limited, as any obstruction of a camera or spectator view, both of the event itself and of sponsoring advertisement banners, is undesirable.

These requirements become even more challenging when providing audio for virtual reality content from sporting events. Virtual reality (VR) replicates an environment that simulates a physical presence in places in the real world or an imagined world, allowing a user to interact with that world and view 360-degree scenes using a VR head mounted device (HMD) or headset. Such devices provide audio associated with the visual content. Audio for virtual reality visual content should accurately reproduce clean sound, as well as mimic and enhance the VR user experience. For example, while a user rotates or moves within a VR environment, the matching audio must be adjusted accordingly to maintain the immersive experience. If a user rotates and moves to the right within a VR scene, audio coming from their right side must be raised, while audio from the left side must be diminished to maintain a degree of realism for the user. These adjustments must happen seamlessly so as not to detract from the overall experience.

As virtual reality is a growing and evolving field, many of the current audio technologies are lacking in their ability to be properly integrated within VR devices. Additionally, technologies available for streaming audio content within a live video feed are currently limited when applied to VR applications.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain example embodiments disclosed herein include a method for matching audio content to virtual reality visual content, including: analyzing received visual content and metadata to determine an optimal audio source associated with the received visual content; configuring the optimal audio source to capture audio content; synthesizing the audio content with the received visual content; and providing the synthesized audio content and received visual content to a virtual reality (VR) device.

Certain example embodiments disclosed herein also include a non-transitory computer readable medium having stored thereon instructions for causing a processing circuitry to perform a process, the process including: analyzing received visual content and metadata to determine an optimal audio source associated with the received visual content; configuring the optimal audio source to capture audio content; synthesizing the audio content with the received visual content; and providing the synthesized audio content and received visual content to a VR device.

Certain example embodiments disclosed herein also include a system for matching audio content to virtual reality visual content, including: a processing circuitry; and a memory, the memory containing instructions that, when executed by the processing circuitry, configure the system to: analyze received visual content and metadata to determine an optimal audio source associated with the received visual content; configure the optimal audio source to capture audio content; synthesize the audio content with the received visual content; and provide the synthesized audio content and received visual content to a VR device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
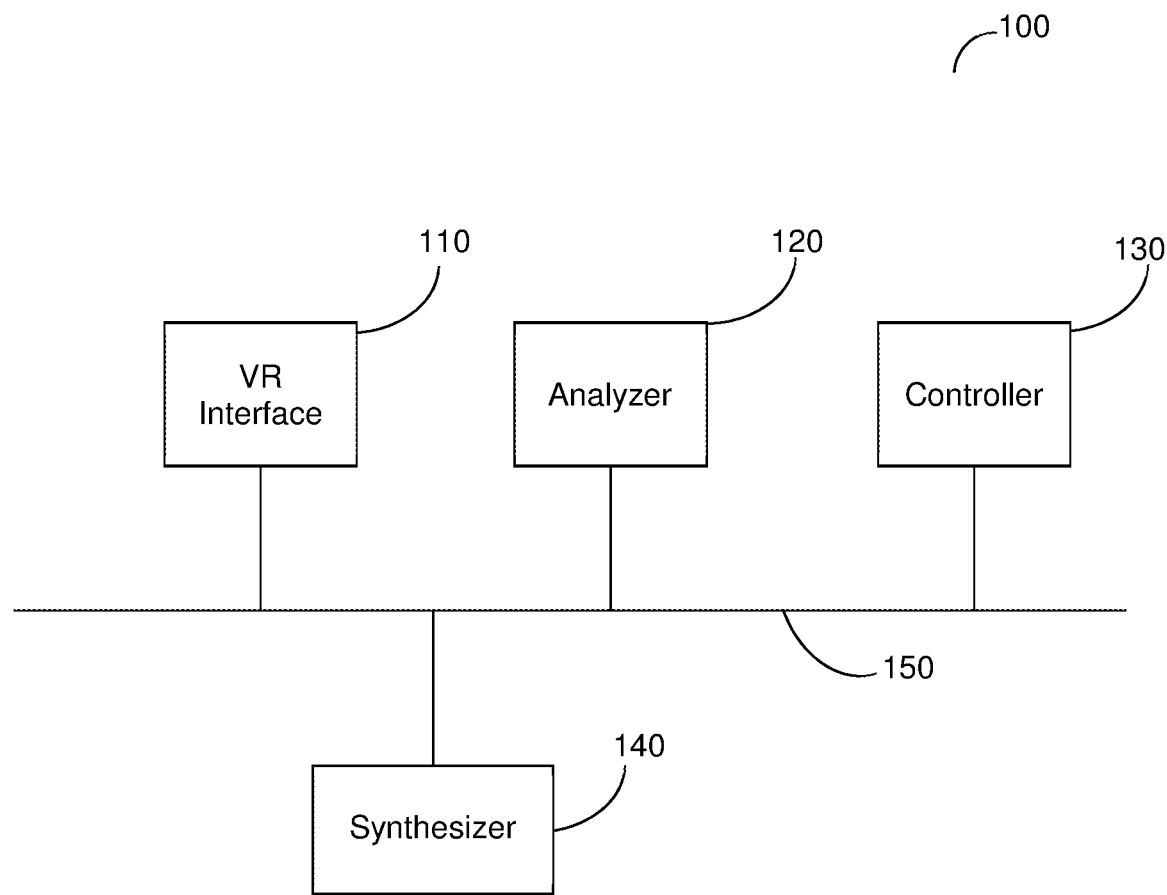
FIG. 1A is a block diagram of a system utilized for matching audio content with virtual reality (VR) visual content according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for matching audio content with virtual reality (VR) visual content. In an embodiment, the system is configured to receive metadata associated with the visual content from a VR headset. The metadata may be, for example, view angles, zoom details, gyroscope or accelerometer measurements, and the like. Based on the received metadata, the system is configured to capture sound beams associated with the VR visual content using a plurality of microphones located in proximity to an area of capture. The captured sound beams are then synthesized by the system and provided to the VR device for reproduction thereon.

FIG. 1A is an example block diagram of a system 100 for matching audio content to virtual reality (VR) visual content according to an embodiment. The system 100 includes a VR interface 110 for receiving and sending content from and to a VR device. The VR device may be, for example, a head mounted device (HMD), a VR headset, VR glasses, and the like. The VR interface 110 may include a wired interface, e.g., Ethernet, or a wireless interface, e.g., Wi-Fi (covered by the IEEE 802.11b/g/n communication standards), WiGig® (covered by the IEEE 802.11ad communication standards).

The system 100 further includes an analyzer 120, a controller 130, and a synthesizer 140. The analyzer 120 is configured to analyze the visual content and metadata associated with visual content received from the VR device via the VR interface 110. The metadata may include, for example, location pointers, time pointers, perspective indicators and movements, a combination thereof, and the like. The metadata may be indicative of a virtual seat from which the user experiences the VR experience via the VR device, e.g., a seat showing a particular perspective from within an arena or stadium.

The analyzer 120 is further configured to analyze the visual content and the metadata, and determine one or more desirable sound sources to provide audio content associated with the visual content. Based on the analysis results, the controller 130 configures desirable audio sources (not shown) to capture audio associated with the visual content. According to an embodiment, the analysis may include one or more computer vision techniques. For example, signatures may be generated based on the metadata and matching the signatures to tagged content extracted based on the signatures. Additionally, neural networks can be employed for analyzing the visual content as well as the metadata. In an embodiment, an audio source is a microphone that may be wired or wireless. The audio sources are located in proximity to the location of the visual content captured by the VR device and are therefore capable of capturing sound beams associated with the visual content.

According to the disclosed embodiment, the synthesizer 140 is configured to synthesize the captured sound beams with the respective VR content, which includes matching the received sound signals with the visual content of the capture area. The matching includes producing a combined audio and visual stream with minimal lag or buffering. The synthesized visual content and sound beams are then provided to the VR device via the VR interface 110. The various components of the system 100 may be connected via a bus 150.

In an embodiment, the synthesizer 140 includes one or more modules (not shown) that are configured to generate one weighted factor per frequency (with one or more frequencies) and supply the factor to a plurality of modules. Each module corresponds to an audio source, e.g., a microphone, and is configured to generate one of a plurality of filters (not shown). In an embodiment, one filter is generated for each sound signal. The filters are generated by using, for example, an inverse one-dimensional fast Fourier transform (IFFT) algorithm.

The modules apply the plurality of filters to the audio captured by the microphones. The filtered sounds are transferred to a module in the synthesizer 140 that is configured to add the filtered sounds. The module is configured to generate a sound beam based on the sum of the manipulated sounds.

As a non-limiting exemplary embodiment, a VR device may be configured to simulate a specific seat within a basketball arena to provide a streaming visual content from that perspective based on a user's gaze. The visual content is analyzed and, based on the analysis, sound beams in proximity to the visual content are identified and captured, e.g., from microphones placed within the arena, based on the user's gaze. The sound beams may be synthesized to the visual content and provided to the VR device in real-time.

According to example embodiments, the controller 130 and/or synthesizer 140 may be implemented using one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Figure 1B:
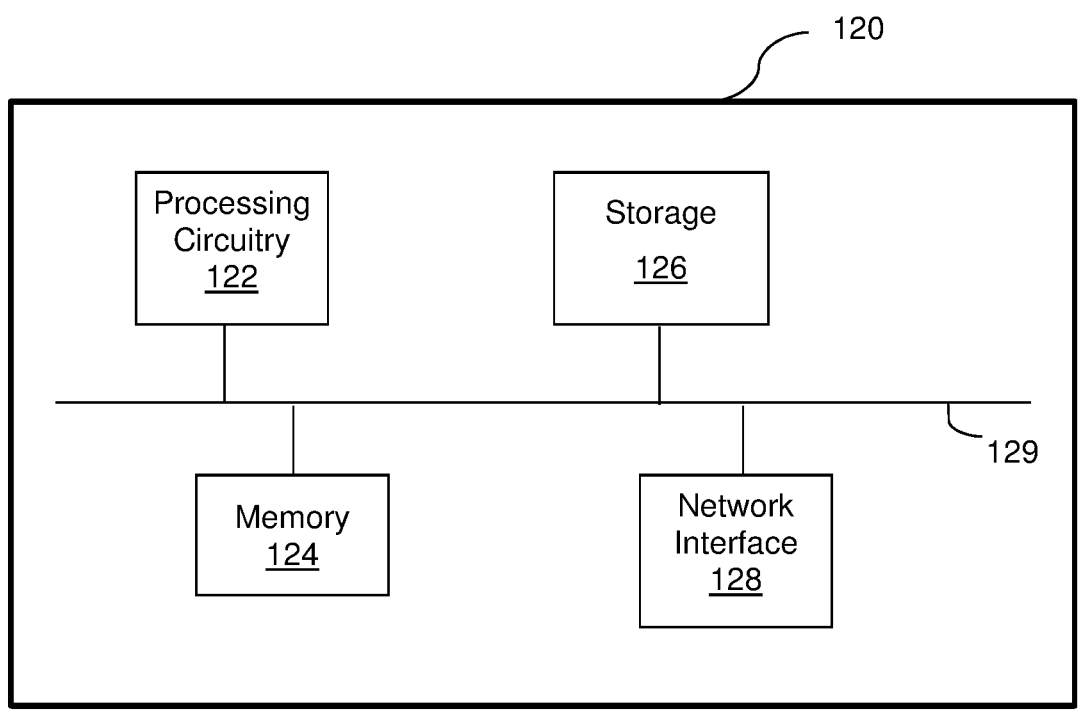
FIG. 1B is a block diagram of an analyzer embodied in the system shown in FIG. 1A.

FIG. 1B is an example block diagram of the analyzer 120 according to an embodiment. The analyzer 120 includes a processing circuitry 122 connected to a memory 124 and a network interface 128 via a bus 129. The processing circuitry 122 is configured to receive visual content from a VR capturing device and metadata associated therewith, e.g., from a VR device. The visual content is then analyzed based on the metadata to determine one or more desirable audio sources related to the visual content. The network interface 128 may include, but is not limited to, a wired interface (e.g., an Ethernet port) or a wireless port (e.g., an 802.11 compliant Wi-Fi card) configured to connect to a network or a bus, e.g., the bus 150 of the system 100 for matching audio content to VR visual content of FIG. 1. The network interface 128 allows the analyzer 120 to communicate with the rest of the system 100 in order to receive content and metadata.

The processing circuitry 122 may be realized as one or more hardware logic components and circuits. Some examples for various types of hardware logic components are noted above.

The memory 124 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 122 to perform the various processes described herein. Specifically, the instructions, when executed, cause the processing circuitry 122 to perform an analysis of a received visual content and metadata to determine a desirable audio source related to the visual content.

In an embodiment, the analyzer 120 may further include a storage 126 where an application configured to analyze visual content and metadata may be stored. The storage 126 may be magnetic storage, optical storage, and the like, and may be realized, in any medium that can be used to store the desired information. The storage 126 may store previous associations between visual content or metadata and audio sources, such that similar visual content and metadata may be more readily associated with particular audio sources, e.g., microphones, based on previously determined audio and visual associations.

Figure 2:
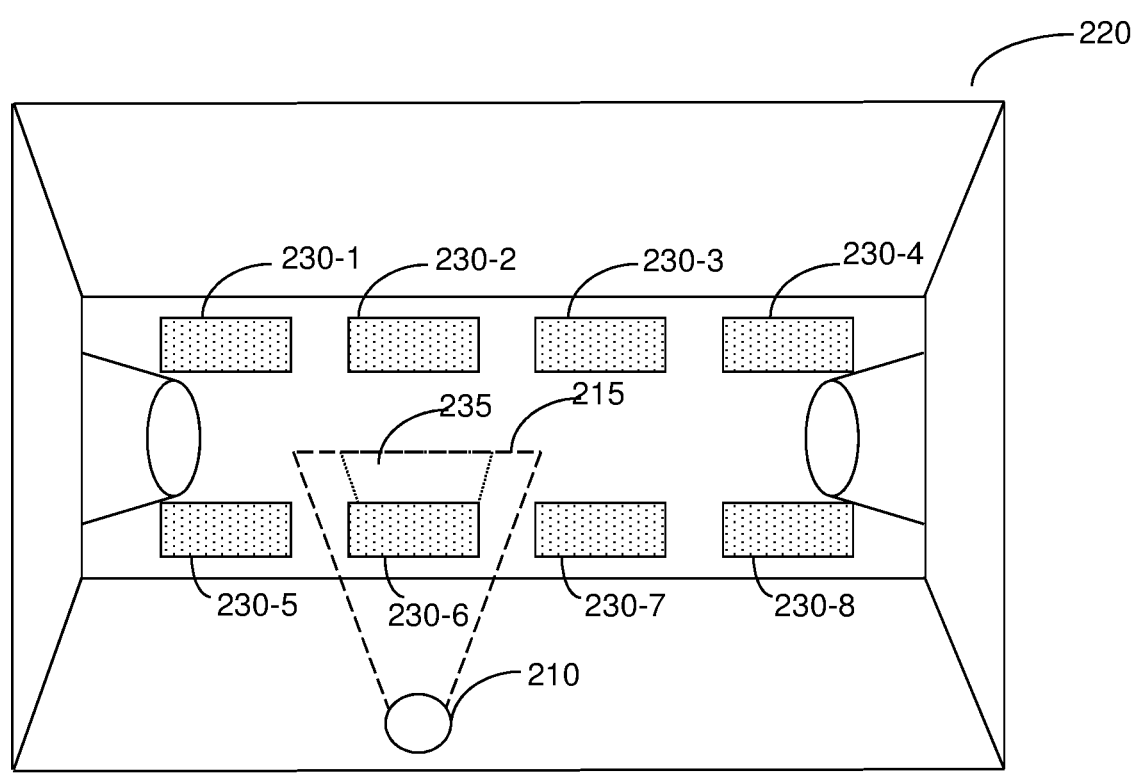
FIG. 2 is a schematic diagram showing a deployment of the disclosed system in a sports arena according to an embodiment

FIG. 2 is a schematic diagram of a sports arena 220 where the system 100 is deployed according to an embodiment. Examples of sports arenas include, but are not limited to, basketball arenas, baseball stadiums, football or soccer stadiums, boxing arenas, martial arts arenas, badminton courts, gymnastics centers, tennis courts, table tennis gyms, and the like. According to this embodiment, the operation of the system 100 is used to match real-time audio content to visual content captured by a VR capturing device placed within the arena.

A VR capturing device 210, e.g., a 360-degree video camera or a rotatable camera, is placed within the arena 220 to simulate the perspective an individual seated in that position and is configured to providing visual content, e.g., a video stream, of the events within the arena 220 within a specific field of view 215. A VR device (not shown) worn by a remote user, is connected to the VR capturing device 210, such as via a network like the Internet, and configured to receive the streamed visual content. In an embodiment, the visual content provided to the VR device from the VR capturing device 210 is provided based on metadata associated with the VR device. For example, if a user wearing the VR device rotates their head from their right to their left, the visual content streamed from the VR capturing device 210 provides video with a perspective panning from right to left to simulate a person sitting in a seat within the arena and looking from right to left. If a 360-degree camera is used as the VR capturing device 210, visual content representing the field of view 215 of the VR device is shown. If a rotating camera is used, the camera or equipment attached thereto is configured to rotate in accordance with the rotating field of view 215 of the VR device.

In an embodiment, the VR device provides additional metadata associated with the use of the VR device, e.g., to an analyzer. For example, the movements and positions of the VR device may be determined, such as the position of the VR device relative to a starting position or a predetermined baseline; the speed at which the position of the VR device changes; eye tracking parameters; gyroscope, inertial measurement unit, or accelerometer measurements; and the like. Based on an analysis of the visual content and the metadata associated with the visual content, the analyzer identifies at least one desirable audio source within the arena, for example, microphone 230-6 of a plurality of microphones 230-1 through 230-8 located in proximity to the arena 220, where the selected microphone 230-6 is determined to be closest to the field of view 215 of the visual content currently being streamed. Alternatively, an audio source may be a sound generating object, e.g., a player in the arena, a ball, etc. Such sound generating object may be selected as a desirable audio source based on the analysis. A desirable audio source is an audio source that provides the most optimal sound related to the streaming visual content of all available audio sources. The optimal audio source may include an audio source that provides the clearest sound associated with the received visual content among all available audio sources.

The selected microphone 230-6 is then configured to capture audio signals, e.g., a sound beam 235, based on the metadata. The captured sound beam 235 is then provided to the VR device 210 simultaneously with the visual content. The capturing of the audio may be performed in real-time as well as after the live occurrence of the event, e.g., based on recorded audio and/or video stored on a storage. For example, the captured audio content and received visual content may be received over a live stream or may be previously recorded and stored on and retrieved from a storage.

Figure 3:
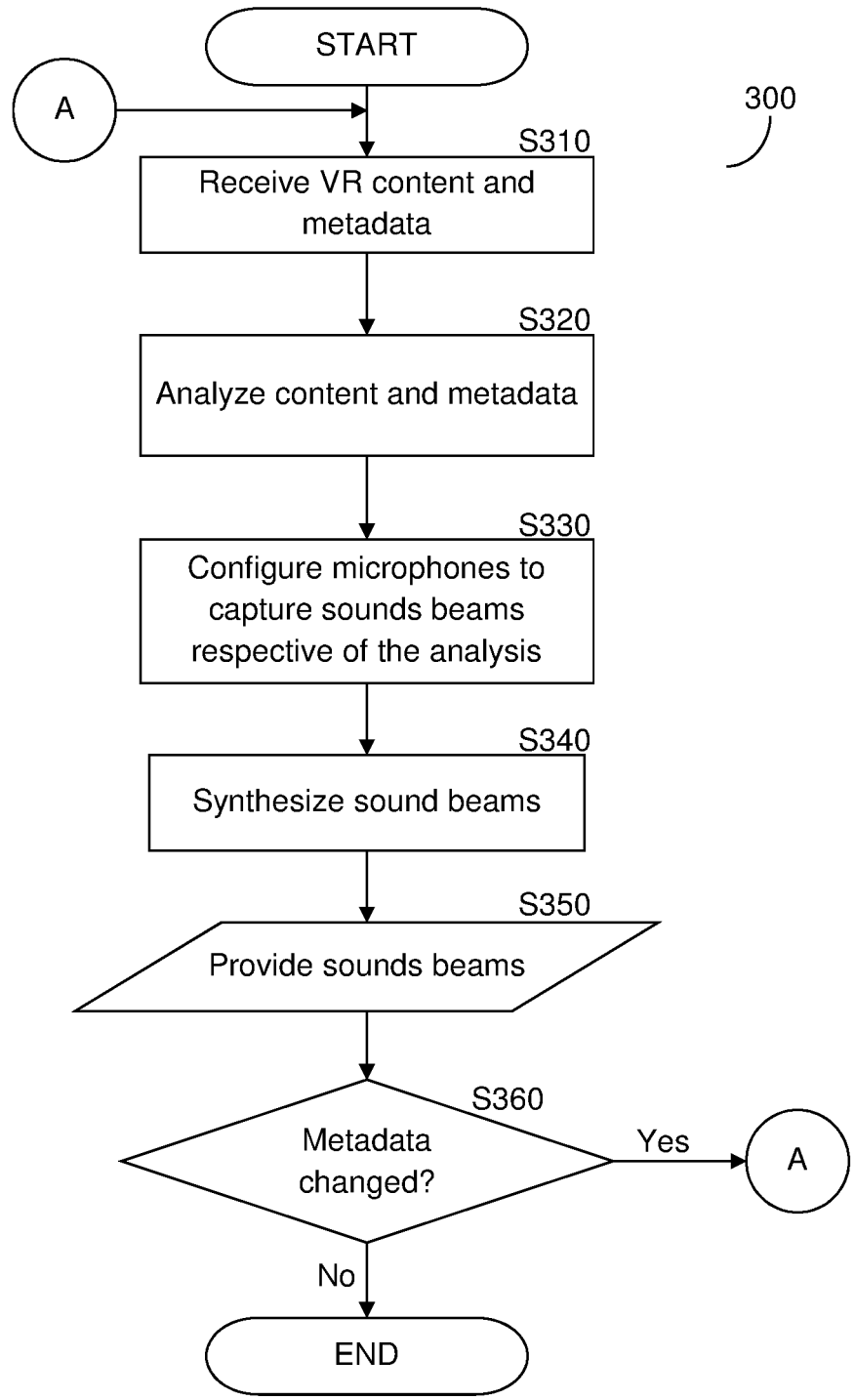
FIG. 3 is a flowchart of a method for matching audio content to VR visual content according to an embodiment.

FIG. 3 is an example flowchart 300 of a method for matching audio content to VR visual content according to an embodiment. At S310, visual content and/or metadata associated therewith is received. The visual content may include content captured by a VR capturing device, for example, the VR capturing device 210 of FIG. 2, and the metadata may be received from a VR device, e.g., a headset worn by a user.

At S320, the visual content and metadata are analyzed to determine a desirable audio source. The desirable audio source may include an audio source capable of providing optimal sound associated with the received visual content. The analysis may include a sound level measurement, e.g., in decibels, captured within a predetermine area. For example, if the predetermined area is a 5 meter radius around a basketball hoop, various audio sources may be tested to determine which one captures the highest sound level associated with the area within that radius. In an embodiment, the analysis includes determining which one or more audio sources of a plurality of audio sources provides the clearest sound associated with the visual content. Additionally, the analysis may include determining the desirable audio source based on previously analyzed visual content and metadata. For example, if a previous visual content showing a specific field of view is associated with a particular audio source, e.g., a right side of the court with a right side positioned microphone, the subsequent desirable audio source may be identified based on that previous relationship, e.g., if the field of view shifts to the left, it may be anticipated that an audio source positioned to the left is the next desirable audio source.

At S330, based on the analysis, the desirable audio source is configured to capture audio. The audio sources may include one or more microphones located in proximity to the scene displayed by the visual content, e.g., within a field of view shown by the VR device. The selected microphones are configured to capture sound beams associated with the visual content.

At S340, the captured sound beams are synthesized to optimally match the visual content. The synthesizing includes aligning the audio content with visual content to minimize lag and provide clear and undistorted sound.

At S350, the synthesized sound beams are then provided to the VR device simultaneously with the visual content, such that the matched audio and visual content can be displayed and reproduced thereon. At S360, it is checked whether the received metadata has changed, e.g., if a user has caused the VR device to shift position. For example, in an embodiment, it is determined if a field of view of the visual content has changed, and if so, the desirable optimal audio source is updated based on the changed field of view. If the metadata has changed, execution continues with S310; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for matching audio content to virtual reality visual content, comprising:
   analyzing received visual content and metadata to determine an optimal audio source associated with the received visual content, wherein analyzing the received visual content and metadata further comprises determining a field of view of the visual content, wherein the metadata is associated with the visual content and includes at least one parameter indicating an area of capture of the visual content, wherein the field of view is determined based on the at least one parameter, wherein the optimal audio source is closest to the field of view among a plurality of available audio sources, wherein each audio source of the plurality of available audio sources is located in proximity to the area of captured of the visual content and is configured to capture sound beams associated with the visual content such that the optimal audio source provides the clearest sound associated with the visual content among the plurality of available audio sources;
   configuring the optimal audio source to capture audio content;
   synthesizing the audio content with the received visual content; and
   providing the synthesized audio content and received visual content to a virtual reality (VR) device.

2. The method of claim 1, further comprising:
   determining a new field of view of the visual content; and
   updating the determined optimal audio source based on the determined new field of view.

3. The method of claim 2, wherein the new field of view is determined based on the received metadata.

4. The method of claim 1, wherein the received metadata includes at least one of: location pointers, time pointers, perspective indicators, a position of a VR device relative to a starting position or a predetermined baseline, a speed at which the position of the VR device changes, eye tracking parameters, gyroscope measurements, inertial measurement unit measurements, and accelerometer measurements.

5. The method of claim 1, wherein synthesizing the audio content further comprises:
   matching the received visual content to the audio content with minimal lag or buffering.

6. The method of claim 1, wherein the audio content and received visual content are received over a live stream.

7. The method of claim 1, wherein the audio content and received visual content are previously recorded and stored on and retrieved from a storage.

8. A system for matching audio content to virtual reality visual content, comprising:
   a processing circuitry; and
   a memory, the memory containing instructions that, when executed by the processing circuitry, configure the system to:
   analyze received visual content and metadata to determine an optimal audio source associated with the received visual content, wherein analyzing the received visual content and metadata further includes determining a field of view of the visual content, wherein the metadata is associated with the visual content and includes at least one parameter indicating an area of capture of the visual content, wherein the field of view is determined based on the at least one parameter, wherein the optimal audio source is closest to the field of view among a plurality of available audio sources, wherein each audio source of the plurality of available audio sources is located in proximity to the area of captured of the visual content and is configured to capture sound beams associated with the visual content such that the optimal audio source provides the clearest sound associated with the visual content among the plurality of available audio sources;
   configure the optimal audio source to capture audio content;
   synthesize the audio content with the received visual content; and
   provide the synthesized audio content and received visual content to a virtual reality (VR) device.

9. The system of claim 8, the system further configured to:
   determine a new field of view of the visual content; and
   update the determined optimal audio source based on the determined new field of view.

10. The system of claim 9, wherein the new field of view is determined based on the received metadata.

11. The system of claim 8, wherein the received metadata includes at least one of: location pointers; time pointers; perspective indicators; a position of a VR device relative to a starting position or a predetermined baseline; a speed at which the position of the VR device changes; eye tracking parameters; gyroscope measurements, inertial measurement unit measurements, and accelerometer measurements.

12. The system of claim 8, wherein synthesizing the audio content further comprises:
matching the received visual content to the audio content with minimal lag or buffering.

13. The system of claim 8, wherein the audio content and received visual content are received over a live stream.

14. The system of claim 8, wherein the audio content and received visual content are previously recorded and stored on and retrieved from a storage.

15. A non-transitory computer readable medium having stored thereon instructions for causing a processing circuitry to perform a process, the process comprising:
analyzing received visual content and metadata to determine an optimal audio source associated with the received visual content, wherein analyzing the received visual content and metadata further comprises determining a field of view of the visual content, wherein the metadata is associated with the visual content and includes at least one parameter indicating an area of capture of the visual content, wherein the field of view is determined based on the at least one parameter, wherein the optimal audio source is closest to the field of view among a plurality of available audio sources, wherein each audio source of the plurality of available audio sources is located in proximity to the area of captured of the visual content and is configured to capture sound beams associated with the visual content such that the optimal audio source provides the clearest sound associated with the visual content among the plurality of available audio sources;
configuring the optimal audio source to capture audio content;
synthesizing the audio content with the received visual content; and
providing the synthesized audio content and received visual content to a virtual reality (VR) device.

* * * * *